June 4, 1940.    M. ZAIGER    2,203,071
DE-ICING WINDSHIELD WIPER
Filed Sept. 1, 1939
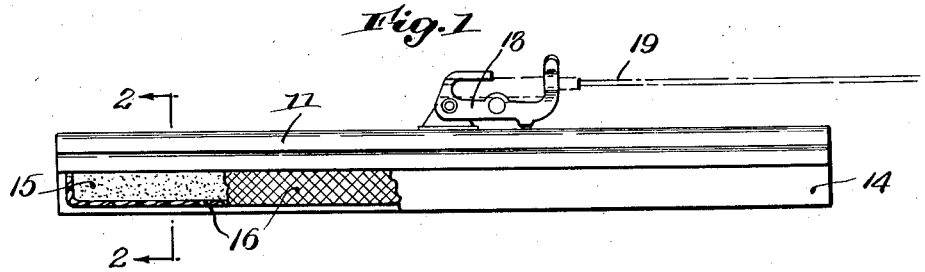
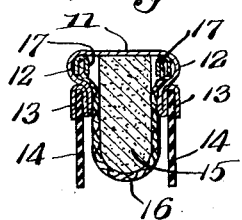
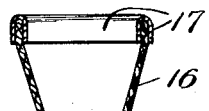
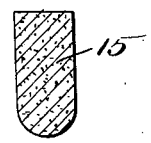
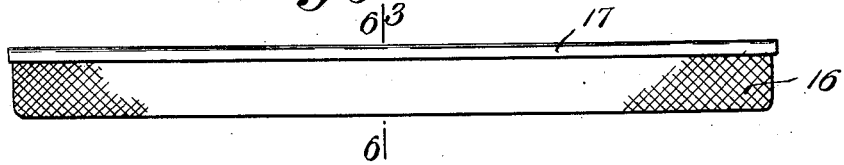
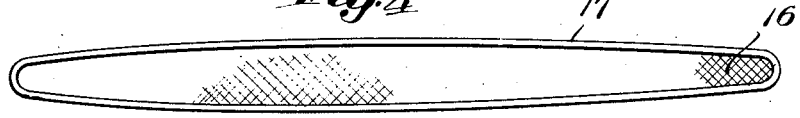
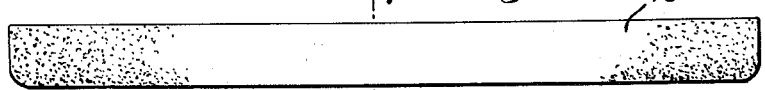
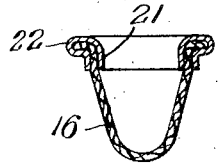
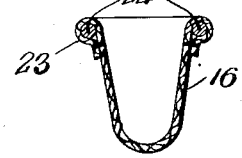
Inventor:
Max Zaiger Patented June 4, 1940

2,203,071

UNITED STATES PATENT OFFICE 2,203,071

DE-ICING WINDSHIELD WIPER

Max Zaiger, Swampscott, Mass.

Application September 1, 1939, Serial No. 293,066

5 Claims. (Cl. 15—250.3)

This invention relates to improvements in windshield wipers for automobiles or other vehicles, and pertains more particularly to wiper blades equipped with a soluble chemical substance effective in removing ice, sleet, or snow from the windshield during operation of the wiper.

The principal purpose of the invention is to provide a de-icing wiper blade comprising a holder constructed and arranged to removably receive a porous bag or envelope containing salt or other ice-dissolving chemical substance, as well as to support rubber wiping elements of the character usually employed in such devices; the compressed salt being easily insertable into the open mouth of the porous fabric envelope, and the mouth of the envelope being provided with a resilient frame so that it may be readily slid endwise between longitudinal channels of the holder and similarly removed therefrom when desired.

Further objects of the invention reside in the structural features of the wiper blade hereinafter described in connection with the accompanying drawing, in which Fig. 1 is a side elevation of a wiper blade constructed in accordance with this invention, portions of the wiper elements being broken away to illustrate the internal construction thereof;

Fig. 2 is a transverse section taken on line 2—2 of Fig. 1;

Fig. 3 is a side elevation of the bag or envelope which receives the compressed salt;

Fig. 4 is a plan view of the bag;

Fig. 5 is a side elevation of a salt block which is inserted into the bag;

Figs. 6 and 7 are transverse sections taken on lines 6—6 and 7—7 of Figs. 3 and 5, respectively; and Figs. 8 and 9 are views similar to Fig. 6, illustrating modified forms of resilient frames for expanding the mouth of the salt block bag.

In the particular form chosen for the purpose of illustration in Figs. 1 to 7 inclusive, the improved windshield wiper blade comprises an elongate metal holder 11 having depending sides shaped to provide longitudinal channels or recesses 12 for receiving the frame of a porous fabric bag containing one or more blocks of compressed salt, the lower margins of the sides of the holder being bent upon themselves to provide grooves or channels 13 for receiving and holding strips of rubber 14 which correspond to the flexible wiping elements of ordinary wiper blades. The upper margins of the rubber strips 14 are securely gripped within the channels 13 respectively, so that said strips are permanently held in spaced relation as best shown in Fig. 2.

The porous receptacle or envelope for holding the compressed salt 15, comprises a long and narrow bag 16 of suitably absorbent textile fabric or the like, and a metal frame 17 is bent over and gripped upon the edge of the fabric around the mouth of the bag or envelope. The frame 17 is preferably made of metal having sufficient resiliency to cause the sides thereof to spring outwardly, thus normally holding the mouth of the bag open, so that any desired number of pieces of compressed salt may be easily inserted therethrough, and so that the frame is yieldingly gripped between the opposite channels 12 of the blade holder 11 when the filled bag is inserted endwise between the sides of the holder.

In such position (Figs. 1 and 2) the salt bag is securely held against accidental displacement, with the bag and its contents depending below the holder 11 and between the rubber wipers 14, whereby the bottom of the bag will engage the surface of the windshield during oscillation of the wiper. It will be apparent, however, that the salt bag may be readily removed from the holder, to replace the salt or for other reasons, by pushing it endwise so that the frame 17 slides out of the retaining channels 12.

The blade holder may be provided with any suitable type of clip or attachment 18 to which the usual oscillating wiper arm 19 (operable by hand or connected to the usual motor, not shown) may be separably attached. As the wiper blade is thus oscillated or reciprocated over the surface of the windshield, the salt bag bears against the pane as aforesaid, and (in freezing temperatures) the friction between the moving parts tends to dissolve any ice, sleet, or snow which has accumulated on the windshield; the resulting liquid film saturates the porous and absorbent fabric bag 16 and thus rapidly dissolves the salt block 15; and the saline solution thus produced quickly and effectively melts or dissolves any remaining ice or sleet in the path of the moving wiper blade. The rubber strips 14 assist in removing the melted ice, and a substantial portion of the windshield is thus kept clear for adequate vision by the operator of the vehicle, regardless of temperature conditions.

It will be apparent that the textile fabric bag is continuously saturated with moisture during operation of the wiper, so that the entire area of the bottom and sides of the salt block therein contained is in intimate contact with moisture, tending progressively to dissolve the block and thereby increase the saline content of the brine solution which is wiped over the surface of the windshield. This arrangement accordingly ensures more rapid ice removing action, over a relatively long period of time, than is possible with the expedients heretofore devised for the same general purpose.

It is apparent, moreover, that the wiper blade herein described may be used without the salt bag, whenever the temperature is above freezing; for removal of the bag and its contents in no wise impairs the efficiency of the rubber wiping elements 14 for clearing the windshield of rain, fog or moisture. The salt bag may be conveniently stored in the automobile, when not in use, and can be quickly and easily applied to the blade holder whenever conditions require a de-icing element, without the necessity of using tools or special attachments. When the salt is completely dissolved the same bag or envelope may be readily refilled with a fresh supply.

It will be understood that the structural details of the device herein described may be varied without departing from the essence of this invention as defined in the appended claims. For example, Figs. 8 and 9 illustrate optional modifications of the frame which reinforces the top of the fabric bag 16 and which serves to hold the bag within the channels 12.

In Fig. 8, the metal frame 21 which is bent upon itself to grip the edge of the fabric, is formed with an external shoulder 22. The provision of such a shoulder permits the use of less springy or resilient metal, because it affords a tighter sliding engagement with the interior wall of the holder channels 12; and the edge of the fabric bag is also gripped more securely within the angle formed by the shoulder 22.

In Fig. 9, the mouth of the bag or envelope 16 is formed with a hem 23 containing a strip of spring wire 24 which acts in the same manner as the resilient frame 17 to frictionally and yieldingly engage within the channels 12 of the holder 11.

Although the drawing shows the compressed salt as formed in one piece, several pieces of the same or varying sizes or shapes may be fitted into the bag, and it is usually preferable to use three pieces of equal length, placed end to end in the bag, in order to avoid the likelihood of breakage when a relatively long block is made in one piece.

I claim:

1. A windshield wiper blade comprising an elongate holder having top and side portions, the sides extending in spaced parallel relation and being formed with opposed grooves constituting channels for removably receiving and holding an ice-removing member, an elongate envelope of porous, absorbent fabric, a soluble chemical substance in said envelope, the envelope having an open mouth, and a relatively narrow frame extending around the mouth of the envelope and secured thereto, said frame being slidable endwise in the channels of the holder whereby the envelope is removably suspended between the sides of the holder in position to engage the windshield.

2. A windshield wiper blade comprising an elongate holder having top and side portions, the sides extending in spaced parallel relation and being formed with opposed grooves constituting channels for removably receiving and holding an ice-removing member, an elongate envelope of porous, absorbent fabric, a soluble chemical substance in said envelope, the envelope having an open mouth, and a frame extending around the mouth of the envelope, said frame being slidable endwise in the channels of the holder whereby the envelope is removably suspended between the sides of the holder in position to engage the windshield, the lower margins of said sides having integral U-shaped flanges providing longitudinal grooves for receiving wiper strips, and rubber wiper strips having their upper margins gripped in the respective grooves and their lower margins extending parallel to the bottom of the envelope at opposite sides thereof.

3. A windshield wiper blade comprising an elongate holder having top and side portions, the sides extending in spaced parallel relation and being formed with opposed grooves constituting channels for removably receiving and holding an ice-removing member, an elongate envelope of porous, absorbent fabric, a soluble chemical substance in said envelope, the envelope having an open mouth, and a resilient frame extending around the mouth of the envelope and tending to hold the same open for easy insertion of the chemical substance, said frame being slidable endwise in the channels of the holder whereby the envelope is suspended between the sides of the holder in position to engage the windshield, the resilience of the frame causing it to expand and frictionally engage said channels to hold the envelope in said position against accidental removal from the holder.

4. A windshield wiper blade comprising an elongate holder having top and side portions, the sides extending in spaced parallel relation and being formed with opposed grooves constituting channels for removably receiving and holding an ice-removing member, an elongate envelope of porous, absorbent fabric, a soluble chemical substance in said envelope, the envelope having an open mouth, and a resilient frame extending around the mouth of the envelope and tending to hold the same open for easy insertion of the chemical substance, said frame being slidable endwise in the channels of the holder whereby the envelope is suspended between the sides of the holder in position to engage the windshield, the resilience of the frame causing it to expand and frictionally engage said channels to hold the envelope in said position against accidental removal from the holder, said frame consisting of a flexible metal strip bent over and secured to the margin of the envelope at the mouth thereof.

5. A windshield wiper blade comprising an elongate holder having top and side portions, the sides extending in spaced parallel relation and being formed with opposed grooves constituting channels for removably receiving and holding an ice-removing member, an elongate envelope of porous, absorbent fabric, a soluble chemical substance in said envelope, the envelope having an open mouth, and a resilient frame extending around the mouth of the envelope and tending to hold the same open for easy insertion of the chemical substance, said frame being slidable endwise in the channels of the holder whereby the envelope is suspended between the sides of the holder in position to engage the windshield, the resilience of the frame causing it to expand and frictionally engage said channels to hold the envelope in said position against accidental removal from the holder, said frame consisting of a piece of spring wire attached to the margin of the envelope at the mouth thereof.

MAX ZAIGER.